Figure 1:
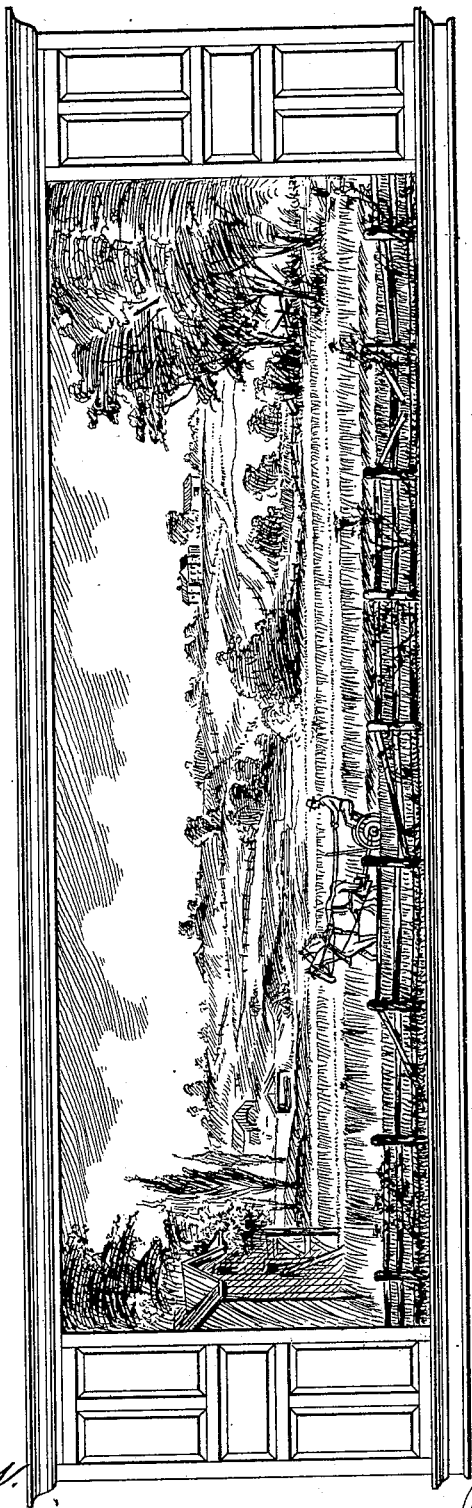

No. 673,587. Patented May 7, 1901.
J. F. STEWARD.
DISPLAY DEVICE.
(Application filed Mar. 8, 1901.)
(No Model.) 2 Sheets—Sheet 1.

WITNESSES: INVENTOR.

No. 673,587. Patented May 7, 1901.
J. F. STEWARD.
DISPLAY DEVICE.
(Application filed Mar. 8, 1901.)
(No Model.) 2 Sheets—Sheet 2.
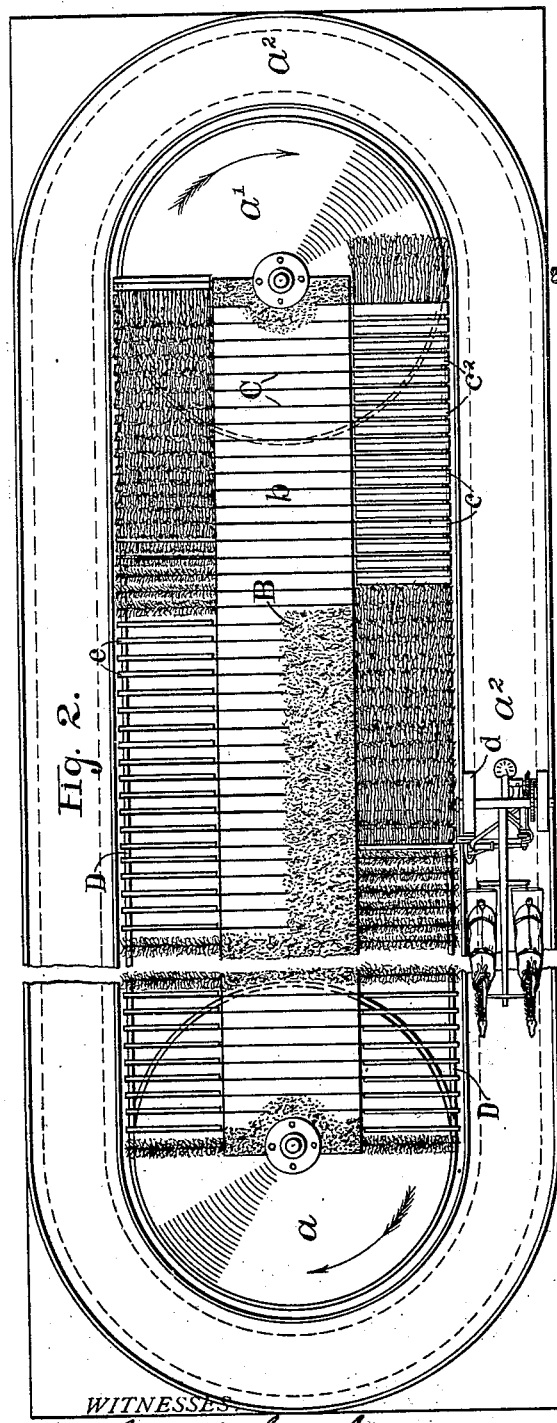
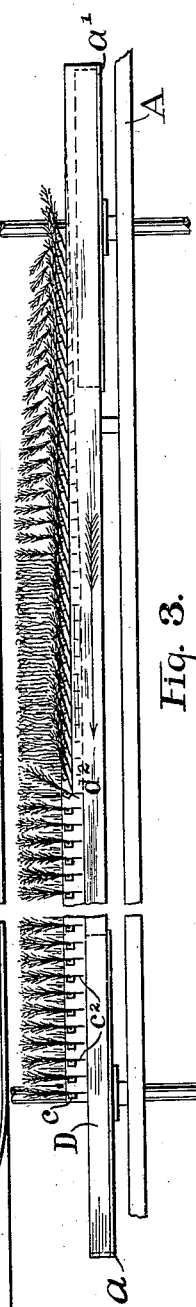
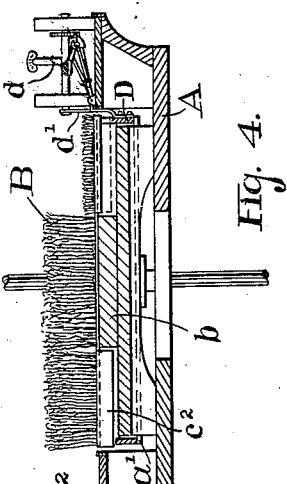
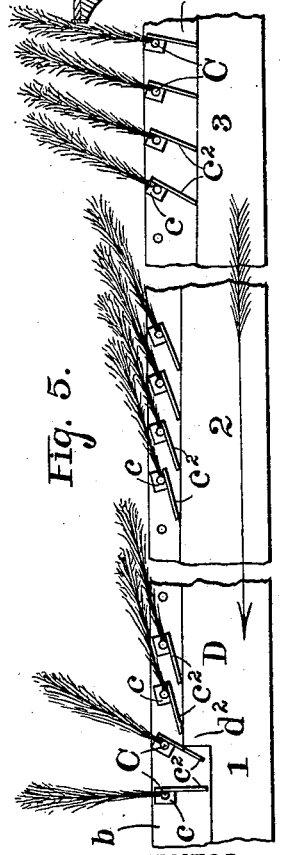
WITNESSES
INVENTOR.
John F. Steward.

UNITED STATES PATENT OFFICE.

JOHN F. STEWARD, OF CHICAGO, ILLINOIS.

DISPLAY DEVICE.

SPECIFICATION forming part of Letters Patent No. 673,587, dated May 7, 1901.

Application filed March 8, 1901. Serial No. 50,326. (No model.)

*To all whom it may concern:*

Be it known that I, JOHN F. STEWARD, a citizen of the United States, residing at Chicago, in the county of Cook and State of Illinois, have invented a Display Device, which may be considered to be an automatic and panoramic model representing a farm scene in miniature; and I do hereby declare the following to be a full, clear, and exact description of the invention, such as will enable others skilled in the art to which it appertains to make and use the same, reference being had to the accompanying drawings, forming a part of this specification.

The object of my invention is to provide an attractive advertising device for illustrating the operation of harvesting-machines in the field.

It consists in a mechanical imitation of a grain-field, a reaping-machine adapted to prostrate grass or grain as if it were being cut, said reaping-machine moved across or around the field, as may be desired, means for sustaining the grass, and in details of construction that will be fully pointed out.

In the drawings, Figure 1 is a perspective view of the invention as it might be seen as a whole. The field and the mechanical devices having to do with it are shown in the foreground. At the back a picture representing a receding landscape is placed. As the team and machine are adapted to turn at each end, a portion of the case is inclosed. At one end is a barn with open door, out of which the team and machine drive. At the other end of the field it passes behind some trees. The arrangement of the ends may be in any suitable way, the object being to hide the mechanism which causes the team to turn around. Fig. 2 is a plan view of the field somewhat shortened by cutting a portion away. Fig. 3 is a side elevation, in part, of parts shown in Fig. 2, showing the means by which the grass is prostrated as the machine passes along. Fig. 4 is a transverse sectional view of the same. Fig. 5 represents the grass raising and prostrating devices and the belt which moves them, somewhat shortened by cutting portions away.

A is a table, preferably having rounded ends, upon which the device is mounted. B may be considered the body of the grass or grain field, which is placed upon the base $b$. This grass may be made of Manila or sisal fiber, if the model is a small one, properly colored. It may be glued to sticks, which are in turn nailed to the base $b$ or secured thereto in any other suitable manner, as it is never required to move. Projecting from the base $b$ are the wires C. Upon these wires are pivoted the imitation blades of grass. I accomplish this preferably by gluing them to a small stick, as $c$, having the hole $c'$, which receives the wire C. To this stick $c$ is secured the pendent plate of metal $c^2$, as shown in Fig. 5. The weight of the pendent plate $c^2$ is just sufficient to cause the whole to hang in the position shown at I in Fig. 5. When left free, what may be considered the tufts of grass arranged along on the sticks $c$ are erect, as shown at the left end of Fig. 3.

Revolving upon vertical axes just above the table A are pulleys $a$ and $a'$. Either one of the shafts of these pulleys may be considered to be the driver. They must turn, however, in the direction indicated by the arrows. By reference to Fig. 2 it will be seen that the two sides of the grass-field are composed for a little distance in of grass that can be prostrated. Around the pulleys $a$ and $a'$ is placed the endless belt D. Mounted upon the table A is the pathway $a^2$ around the field for the miniature machine. To the endless belt D is attached the machine $d$ by means of a strong arm $d'$, which reaches down through the space between the pathway $a^2$ and the pivoted tufts of grass. It will thus be seen that if the pulleys $a$ and $a'$ are rotated the belt will carry the machine around the field.

The machine has no cutting apparatus; but the tufts of grass are prostrated by means of the belt, the machine being so placed that the tufts will be prostrated at the point where the cutting apparatus would be placed, as will now be described. At the left, Fig. 5, it will be seen that some of the grass is standing and other portions prostrated, while farther along to the right the grass is seen to be rising. The belt may be, say, three inches wide at its wider portion and two inches at its narrower portion. At $d^2$ the belt passes abruptly from its narrowest portion to its widest, thus presenting a shoulder. This shoulder as it advances engages the pendent plates $c^2$, raises them, and prostrates the tufts of grass, as shown at 1 in Fig. 5. While passing under them it causes the tufts of grass to remain prostrate as long as the full width of the belt is maintained.

Substantially diametrically opposite the shoulder $d^2$ the belt passes very gradually from its widest portion to its narrowest, as shown at 2 and 3 in Fig. 5, thus allowing the pendent plates $c^2$ to drop, and consequently the tufts of grass to rise very slowly as the belt advances. The portion of the belt which is full width should be nearly equal to the length of the whole field, so that the grass upon one side will apparently be cut and the machine cutting on the other side before the grass begins to rise. The object is this: A person witnessing the operation would naturally keep his eyes on the machine and horses, and hence would not notice the slight rising of the grass upon the opposite side of the field. At its narrowest portion the upper edge of the belt no longer remains in contact with the pendent plate $c^2$, allowing the grass or grain to remain in its standing position.

From the description the operation of the device is evident. Power is applied to the shafts of either of the pulleys $a$ or $a'$, carrying the belt D, to which is attached the machine. As the pulleys revolve, the belt, with its attached machine, is carried around the miniature field, and the grass or grain apparently cut being prostrated as it goes. As it is being thus mowed down on one side of the field it is allowed to rise almost imperceptibly on the other, making the operations continuous. In order to have the effect as realistic as possible, horses are applied to the machine and by mechanism not necessary to here explain are caused to step and nod their heads as they walk.

As I have constructed this device it stands eighteen feet in length; but the matter of length is inessential. The longer the field is the more slowly the grass may be made to rise, and, rising slowly, thus regain its original height imperceptibly. The minor details of the construction may, however, be varied to suit the fancy of the builder.

What I claim as my invention, and desire to secure by Letters Patent, is—

1. A miniature harvest-field, an imitation crop, the latter at one or more sides of the field so supported as to become prostrate at the proper instant, and an imitation harvesting-machine automatically moved around said field, all combined substantially as described.

2. A miniature harvest-field, an imitation crop, the latter at one or more sides of the field so supported as to become prostrate at the proper instant, an imitation harvesting-machine automatically moved around said field, and a panoramic picture behind said field, all combined substantially as described.

3. The combination of a miniature harvest-field consisting of imitation grass or grain, adapted at one or more sides to be prostrated, a grain or grass harvesting machine, and mechanism for continuously moving the said machine around the field, said mechanism adapted to prostrate the grass or grain beside the said machine, substantially as described.

4. The combination of a miniature harvest-field consisting of imitation grass or grain, adapted at one or more sides to be prostrated, a grain or grass harvesting machine, mechanism for continuously moving the said machine around the field, said mechanism adapted to prostrate the grass or grain beside the said machine, said conveying mechanism also adapted to permit said grass or grain to rise to a standing position after being prostrated, substantially as described.

In witness whereof I affix my signature in the presence of two witnesses.

JOHN F. STEWARD.

Witnesses:
CHAS. M. CHAMBERS,
J. W. DAVIS.